United States Patent
Yang et al.

(10) Patent No.: US 7,911,813 B2
(45) Date of Patent: Mar. 22, 2011

(54) OFFLINE SYNCHRONOUS RECTIFYING CIRCUIT WITH SENSE TRANSISTOR FOR RESONANT SWITCHING POWER CONVERTER

(75) Inventors: Ta-yung Yang, Milpitas, CA (US);
Chen-Hui Chan, Taipei (TW);
Chou-Sheng Wang, Keelung (TW);
Shih-Hung Hsieh, Taipei (TW)

(73) Assignee: System General Corp., Taipei Hsien (TW)

( * ) Notice: Subject to any disclaimer, the term of this patent is extended or adjusted under 35 U.S.C. 154(b) by 450 days.

(21) Appl. No.: 12/176,427

(22) Filed: Jul. 21, 2008

(65) Prior Publication Data

US 2010/0014324 A1    Jan. 21, 2010

(51) Int. Cl.
*H02M 3/335* (2006.01)
(52) U.S. Cl. ....................... 363/21.06; 363/89
(58) Field of Classification Search ............... 363/21.06, 363/21.08, 21.13, 21.16, 21.12, 49, 17, 84, 363/89, 127; 323/222, 224, 282–286, 239, 323/299; 307/66, 87, 31, 112
See application file for complete search history.

(56) References Cited

U.S. PATENT DOCUMENTS

| | | | | |
|---|---|---|---|---|
| 3,921,035 | A | * | 11/1975 | Holmes ......................... 315/307 |
| 4,694,402 | A | * | 9/1987 | McEachern et al. ............. 702/71 |
| 5,055,703 | A | * | 10/1991 | Schornack ....................... 307/64 |
| 5,920,475 | A | * | 7/1999 | Boylan et al. .................. 363/127 |
| 5,929,615 | A | * | 7/1999 | D'Angelo et al. ............. 323/224 |
| 6,191,964 | B1 | * | 2/2001 | Boylan et al. .................... 363/89 |

* cited by examiner

*Primary Examiner* — Rajnikant B Patel
(74) *Attorney, Agent, or Firm* — Jianq Chyun IP Office

(57) ABSTRACT

A synchronous rectifying circuit of a resonant switching power converter is provided to improve the efficiency. The synchronous rectifying circuit includes a power transistor and a diode connected to a transformer and an output ground of the power converter for rectifying. A sense transistor is coupled to the power transistor for generating a mirror current correlated to a current of the power transistor. A controller generates a driving signal to control the power transistor in response to a switching-current signal. A current-sense device is coupled to the sense transistor for generating the switching-current signal in response to the mirror current. The controller enables the driving signal to turn on the power transistor once the diode is forwardly biased. The controller generates a reset signal to disable the driving signal and turn off the power transistor once the switching-current signal is lower than a threshold.

14 Claims, 4 Drawing Sheets

US 7,911,813 B2

OFFLINE SYNCHRONOUS RECTIFYING CIRCUIT WITH SENSE TRANSISTOR FOR RESONANT SWITCHING POWER CONVERTER

BACKGROUND OF THE INVENTION

1. Field of Invention

The present invention relates to power converters, and more particularly, relates to a synchronous rectifying circuit for a resonant switching power converter.

2. Description of Related Art

FIG. 1 shows a schematic circuit of a conventional resonant switching power converter. The circuit includes a transformer 10 to provide galvanic isolation from a line input to an output of the power converter for safety. Switches 20 and 30 develop a half bridge circuit to switch the transformer 10 and a resonant tank formed by an inductor 5 and a capacitor 40. The inductor 5 can be an inductance device or a leakage inductance of a primary winding $N_P$ of the transformer 10. The inductance of the inductor 5 and the capacitance of the capacitor 40 determine a resonant frequency $f_0$ of the resonant tank as following equation shows:

$$f_0 = \frac{1}{2\pi\sqrt{L \times C}} \qquad (1)$$

where L and C are respectively the inductance of the inductor 5 and the capacitance of the capacitor 40.

The transformer 10 transfers the energy from the primary winding $N_P$ to secondary windings $N_{S1}$ and $N_{S2}$ of the transformer 10. Rectifiers 61, 62 and a capacitor 65 perform the rectifying and filtering for generating a DC voltage $V_O$ at the output of the power converter. The detailed skill of the resonant switching power converter can be found in the text book "Resonant Power Converters" authored by Marian K. Kazimierczuk and Dariusz Czarkowski in 1995 and published by John Wiley & Sons, Inc.

Although resonant switching power converters can achieve high efficiency and low electric-magnetic interference (EMI), a forward voltage of the rectifiers 61 and 62 still causes significant power losses. The objective of the present invention is to provide a synchronous rectifying circuit for resonant switching power converters to achieve higher efficiency.

SUMMARY OF THE INVENTION

An integrated synchronous rectifier (synchronous rectifying circuit) for a resonant switching power converter includes a power transistor and a diode connected to a transformer and a output ground of the resonant switching power converter for rectifying. A sense transistor is coupled to the power transistor for generating a mirror current correlated to a current of the power transistor. A controller generates a driving signal to control the power transistor in response to a switching-current signal. A current-sense device is coupled to the sense transistor for generating the switching-current signal in response to the mirror current. The controller enables the driving signal to turn on the power transistor once the diode is forwardly biased. The controller generates a reset signal to disable the driving signal and turn off the power transistor when the switching-current signal is lower than a threshold.

The controller includes an inner-lock circuit for generating an inner-lock signal as the driving signal is enabled. The driving signal is initiated and enabled once the inner-lock signal is disabled. A maximum-on-time circuit generates a maximum-on-time signal to turn off the power transistor for determining a maximum on-time of the power transistor. The controller includes a latch circuit for producing a driving signal to control the power transistor. The controller further includes a plurality of comparators for setting or resetting the latch circuit. The driving signal is enabled once the diode is forwardly biased, and the driving signal is disabled once the switching-current signal is lower than the threshold.

Furthermore, the controller includes a phase-lock circuit for generating a phase-lock signal in response to the driving signal and the reset signal. The phase-lock signal is used to turn off the power transistor once the switching-current signal is lower than the threshold.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION OF EMBODIMENTS

Figure 1:
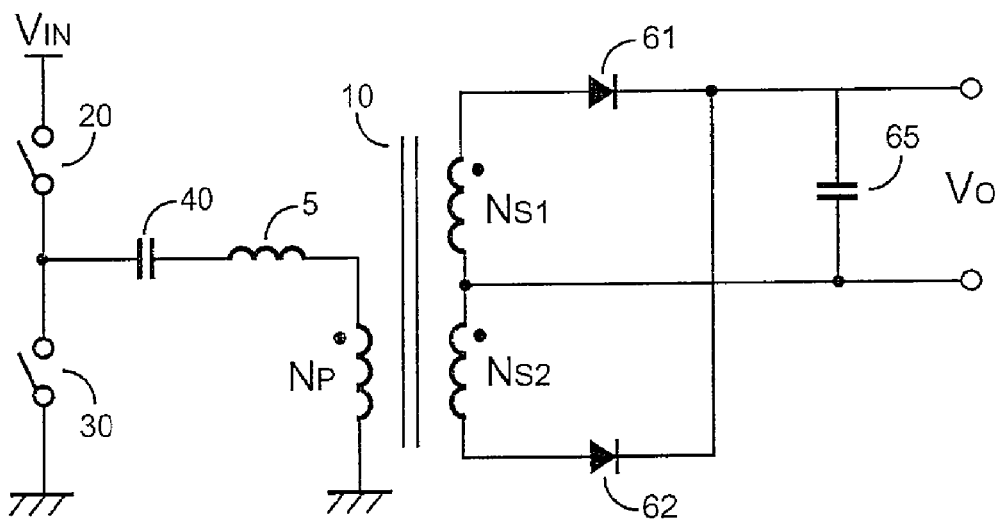
FIG. 1 shows a schematic circuit of a conventional resonant switching power converter.
Figure 2:
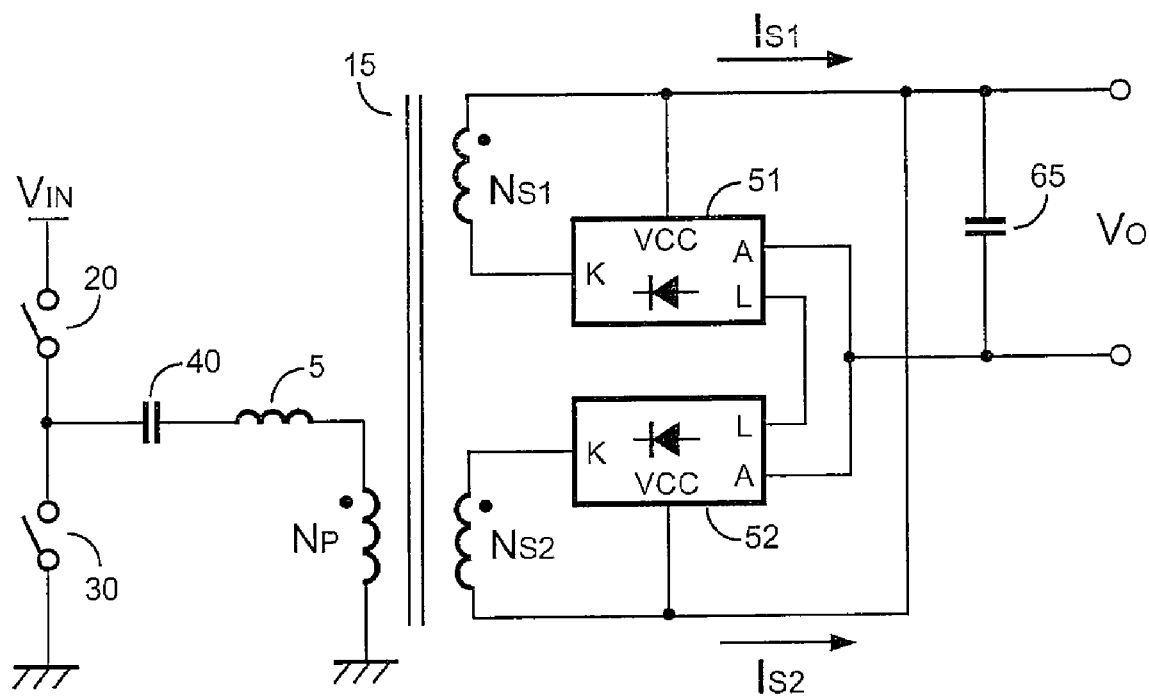
FIG. 2 shows an embodiment of a resonant switching power converter having integrated synchronous rectifiers according to the present invention.

FIG. 2 shows a resonant switching power converter having integrated synchronous rectifiers (synchronous rectifying circuit). The resonant switching power converter includes a transformer 15 having a primary winding $N_P$ and secondary windings $N_{S1}$ and $N_{S2}$. The primary winding $N_P$ of the transformer 15 is switched by two switches 20 and 30. An integrated synchronous rectifier 51 has a cathode terminal K connected to the secondary winding $N_{S1}$. An anode terminal A of the integrated synchronous rectifier 51 is connected to an output ground of the resonant switching power converter. An integrated synchronous rectifier 52 having a cathode terminal K and a anode terminal A is connected from the secondary winding $N_{S2}$ to the output ground of the resonant switching power converter.

The integrated synchronous rectifiers 51 and 52 generate an inner-lock signal $V_{LK}$ to prevent the integrated synchronous rectifiers 51 and 52 from being simultaneously turned on. The integrated synchronous rectifier 51 is disabled once a first switching current $I_{S1}$ is lower than a current-threshold.

The integrated synchronous rectifier 52 is also disabled once a second switching current $I_{S2}$ is lower than another current-threshold.

Figure 3:
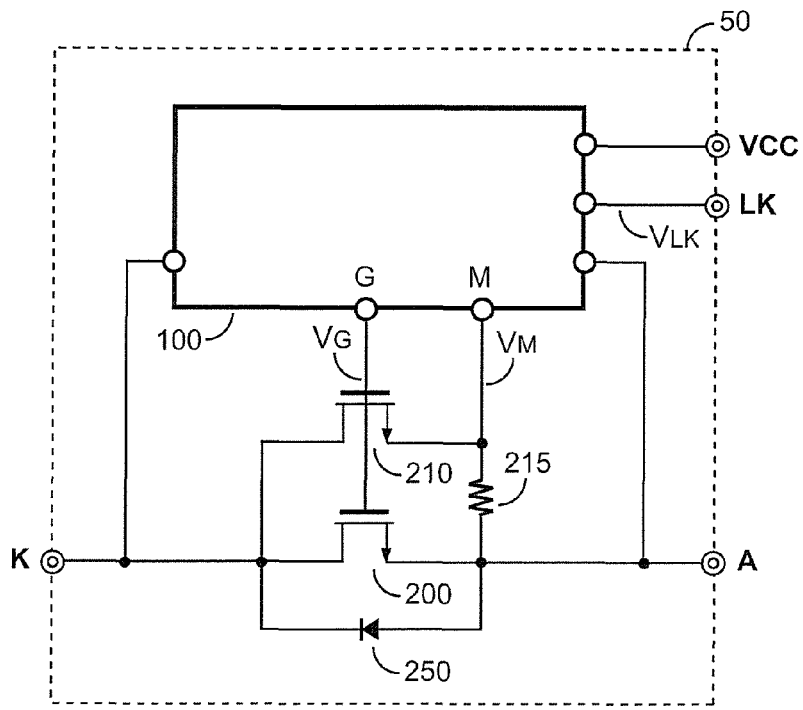
FIG. 3 shows an embodiment of the integrated synchronous rectifier according to the present invention.

FIG. 3 shows an integrated synchronous rectifier 50, which embodies the integrated synchronous rectifiers 51 and 52. The integrated synchronous rectifier 50 includes a power transistor 200, a sense transistor 210, a diode 250, a current-sense device 215 and a controller 100. The current-sense device 215 can be a resistor or a circuit. The controller 100 generates a driving signal $V_G$ to control the power transistor 200 in response to a switching-current signal $V_M$. The diode 250 is connected in parallel with the power transistor 200. The diode 250 can be, for example, a schottky diode or a parasitic diode of the power transistor 200. The power transistor 200 is connected between the cathode terminal K and the anode terminal A. The cathode terminal K of the integrated synchronous rectifier 50 is coupled to the secondary windings $N_{S1}$ or $N_{S2}$ of the transformer 10. The anode terminal A is coupled to the output ground of the resonant switching power converter. The sense transistor 210 is coupled to the power transistor 200 for generating a mirror current correlated to a current of the power transistor 200. The current-sense device 215 is coupled to the sense transistor 210 to generate the switching-current signal $V_M$ in response to the switching current ($I_{S1}$ or $I_{S2}$) of the transformer 15. The current-sense device 215 is coupled to the sense transistor 210 for generating the switching-current signal $V_M$ in accordance with the mirror current. The controller 100 enables the driving signal $V_G$ to turn on the power transistor 200 and the sense transistor 210 once the diode 250 is forwardly biased. The controller 100 will generate a reset signal to disable the driving signal $V_G$ and to turn off the power transistor 200 and the sense transistor 210 when the switching-current signal $V_M$ is lower than a threshold $V_T$. An inner-lock terminal LK outputs the inner-lock signal $V_{LK}$ to indicate the on/off status of the power transistor 200.

Figure 4:
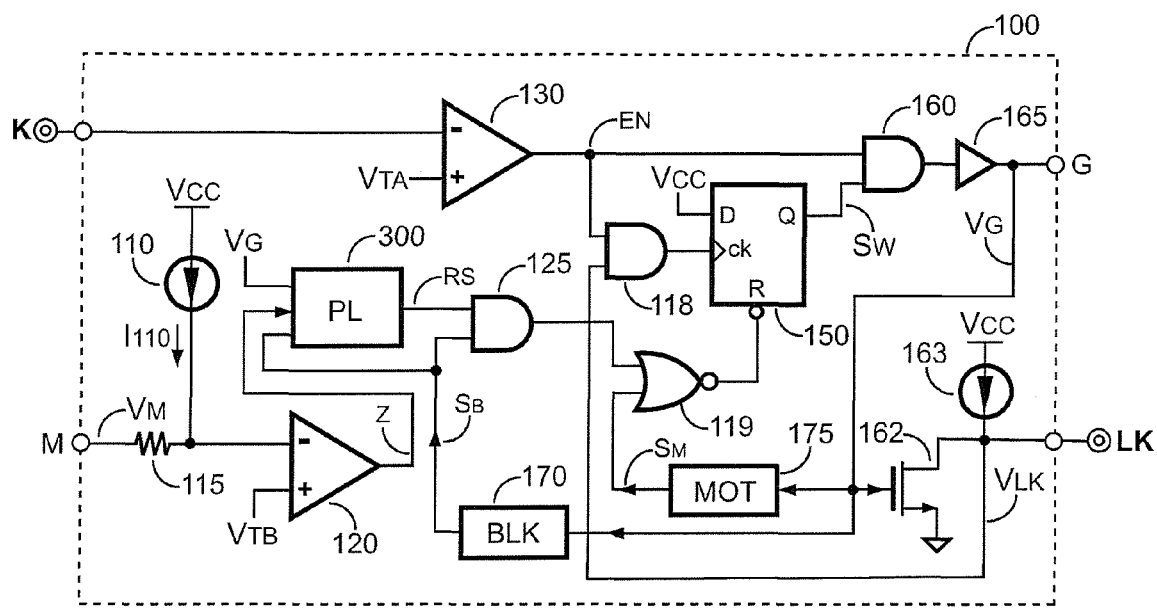
FIG. 4 shows an embodiment of a controller of the integrated synchronous rectifier according to the present invention.

FIG. 4 shows an embodiment of the controller 100. A threshold $V_{TA}$ is supplied to a positive input of a comparator 130. A negative input of the comparator 130 is coupled to the cathode terminal K of the integrated synchronous rectifier 50. An output EN of the comparator 130 and the inner-lock signal $V_{LK}$ are supplied to two inputs of an AND gate 118. An output of the AND gate 118 is coupled to a clock-input ck of a flip-flop 150. A reset-input R of the flip-flop 150 is controlled by an output of an NOR gate 119. An output $S_W$ of the flip-flop 150 and the output EN of the comparator 130 are supplied to two inputs of an AND gate 160. The flip-flop 150 operates as a latch circuit. An output of the AND gate 160 is connected to an output buffer 165. The driving signal $V_G$ is generated at an output of the output buffer 165 for controlling the power transistor 200. An inner-lock circuit is developed by a transistor 162 and a current source 163. The driving signal $V_G$ is supplied to the transistor 162 to generate the inner-lock signal $V_{LK}$. The inner-lock signal $V_{LK}$ is generated as the driving signal $V_G$ is enabled. The driving signal $V_G$ is initiated and enabled once the inner-lock signal $V_{LK}$ is disabled.

A maximum on-time of the driving signal $V_G$ is determined by a maximum-on-time (MOT) circuit 175. The driving signal $V_G$ is supplied to the input of the MOT circuit 175. A maximum-on-time signal $S_M$ is generated in response to the enabling of the driving signal $V_G$ after a delay time. The maximum-on-time signal $S_M$ is supplied to an input of the NOR gate 119 to reset the flip-flop 150. The maximum on-time of the driving signal $V_G$ is thus determined by the delay time provided by the MOT circuit 175. The driving signal $V_G$ turns on the power transistor 200 once the voltage at the cathode terminal K is lower than the threshold voltage $V_{TA}$ while the diode 250 is being turned on.

Another input of the NOR gate 119 is connected to an output of an AND gate 125. An input of the AND gate 125 is supplied with a blanking signal $S_B$ provided by a blanking circuit 170. An input of the blanking circuit 170 is supplied with the driving signal $V_G$. The blanking circuit 170 provides a blanking time to achieve a minimum on-time for the driving signal $V_G$. A phase-lock circuit 300 supplies a phase-lock signal RS to another input of the AND gate 125. The phase-lock signal RS is generated in response to the driving signal $V_G$, the blanking signal $S_B$, and a reset signal Z. The phase-lock signal RS is used to accurately turn off the driving signal $V_G$ without the interference of the circuit delay and/or the variation of the switching frequency. The reset signal Z is generated at an output of a comparator 120. A positive input of the comparator 120 is supplied with a threshold $V_{TB}$. A negative input of the comparator 120 is coupled to a joint of a current source 110 and a resistor 115. The resistor 115 is further supplied with the switching-current signal $V_M$. The driving signal $V_G$ is disabled to turn off the power transistor 200 when the switching-current signal $V_M$ is lower than a threshold $V_T$.

The threshold $V_T$ can be expressed as, $$V_T = [(I_{110} \times R_{115}) - V_{TB}] \quad (2)$$

The inequality aforementioned can thus be expressed as, $$V_M < [(I_{110} \times R_{115}) - V_{TB}] \quad (3)$$

where $I_{110}$ is a current of the current source 110, and $R_{115}$ is a resistance of the resistor 115.

The voltage at the cathode terminal K is lower than that of the threshold $V_{TA}$ when the diode 250 is conducted and forwardly biased. Therefore, the power transistor 200 is only turned on after the diode 250 is turned on, which achieves soft-switching operation for the power transistor 200. In addition, the driving signal $V_G$ is disabled and the power transistor 200 is turned off when the diode 250 is reversely biased. Moreover, the phase-lock signal RS turns off the power transistor 200 when the switching-current signal $V_M$ is lower than the threshold $V_T$.

Figure 5:
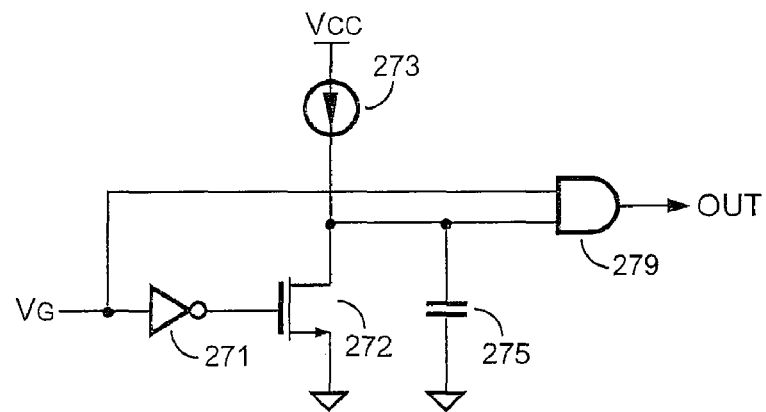
FIG. 5 shows an embodiment for a maximum-on-time circuit and a blanking circuit of the controller according to the present invention.

FIG. 5 shows an embodiment for the MOT circuit 175 and the blanking circuit 170. A current source 273 is used to charge a capacitor 275. A transistor 272 is employed to discharge the capacitor 275. The driving signal $V_G$ controls the transistor 272 via an inverter 271. The driving signal $V_G$ is further supplied to an input of an AND gate 279. Another input of the AND gate 279 is coupled to the capacitor 275. Once the driving signal $V_G$ is enabled, an output of the AND gate 279 generates the maximum-on-time signal $S_M$ (for MOT circuit 175) or the blanking signal $S_B$ (for blanking circuit 170) to disable the driving signal $V_G$ after the delay time (for MOT circuit 175) or blanking time (for blanking circuit 170). The delay time/blanking time can be determined by a current of the current source 273 and a capacitance of the capacitor 275.

Figure 6:
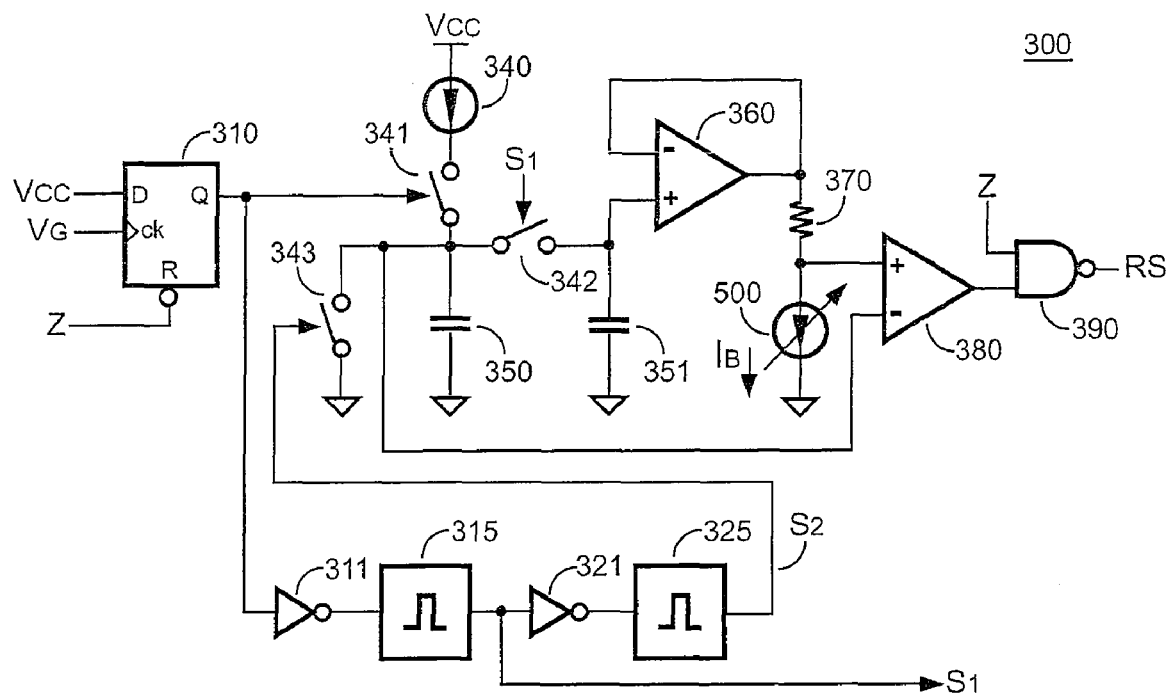
FIG. 6 shows an embodiment of a phase-lock circuit of the controller according to the present invention.

FIG. 6 shows an embodiment of the phase-lock circuit 300. It includes a flip-flop 310 which outputs a period signal PS in response to the driving signal $V_G$ and the reset signal Z. A current source 340 charges a capacitor 350 when a switch 341 is turned on by the period signal PS. A ramp signal RMP is thus generated across the capacitor 350. The period signal PS is supplied to an input of an inverter 311. An output of the inverter 311 is coupled to an input of a pulse generation circuit 315. An output of the pulse generation circuit 315 generates a sampling signal $S_1$. The sampling signal $S_1$ is supplied to an input of an inverter 321. An output of the inverter 321 is coupled to an input of a pulse generation circuit 325. An output of the pulse generation circuit 325 generates a clearing signal $S_2$. The sampling signal $S_1$ turns on a switch 342 to conduct a voltage across the capacitor 350 to a capacitor 351. After that, the clearing signal $S_2$ discharges the capacitor 350 via a switch 343. The voltage across the capacitor 351 is correlated to an enabling period of the period signal PS. The voltage across the capacitor 351 is supplied to an input of a comparator 380 via a buffer amplifier 360 and a resistor 370. A programmable current source 500 is further coupled to the resistor 370 to generate a voltage drop across the resistor 370. Another input of the comparator 380 is supplied with the ramp signal RMP. An output of the comparator 380 and the reset signal Z are supplied to two inputs of an NAND gate 390. The NAND gate 390 generates the phase-lock signal RS to disable the driving signal $V_G$. A programmable current $I_B$ of the programmable current source 500 is adjusted to generate the phase-lock signal RS.

Figure 7:
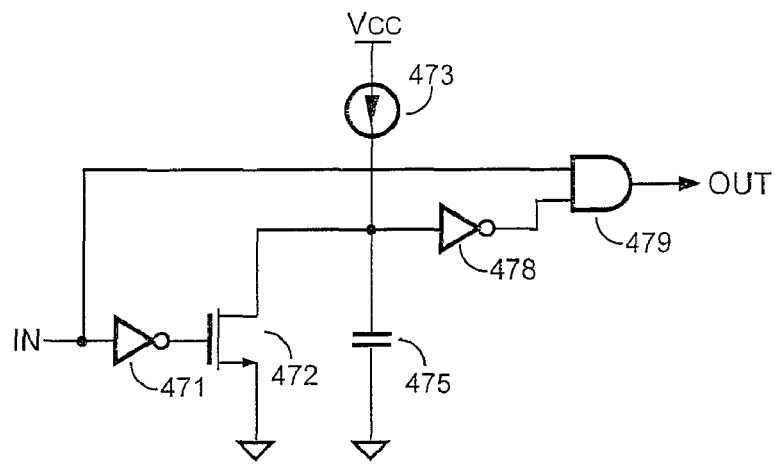
FIG. 7 shows an embodiment of a programmable current source of the phase-lock circuit according to the present invention.

FIG. 7 shows an embodiment of the programmable current source 500. An AND gate 511 is used for enabling a pulse signal PLS when the driving signal $V_G$ is produced after the reset signal Z is disabled. The pulse signal PLS initiates an up-count operation via a direction terminal U/D of an up-down counter 600, which causes an increase in the programmable current $I_B$ and generates the phase-lock signal RS soon (disable the driving signal $V_G$ shortly or disable the driving signal $V_G$ when the reset signal Z is still enabled). If the pulse signal PLS is disabled, the up-down counter 600 will perform a down-count operation, which causes a decrease in the programmable current $I_B$ and generates the phase-lock signal RS shortly. The reset signal Z, the driving signal $V_G$, and the blanking signal $S_B$ are supplied to the AND gate 511. The blanking signal $S_B$ is further used to reset the flip-flop 520 via an inverter 525 and a pulse generation circuit 515. The up-down counter 600 is clocked by the output $S_W$ of the flip-flop 150 in FIG. 4. The outputs OP1~OPN of the up-down counter 600 are used to program the programmable current $I_B$ drawn by current sources 575~595 via switches 571~591.

Figure 8:
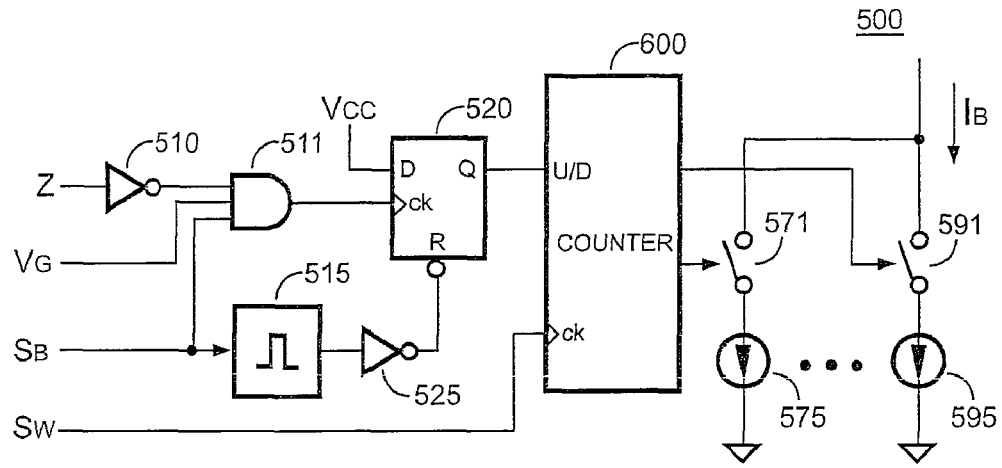
FIG. 8 shows an embodiment of a pulse generation circuit.

FIG. 8 shows an embodiment for pulse generation circuits 315, 325, and 515. A current source 473 is used to charge a capacitor 475. A transistor 472 is used to discharge the capacitor 475. An input terminal IN receives an input signal to control the transistor 472 via an inverter 471. The input terminal IN is further connected to an input of an AND gate 479. Another input of the AND gate 479 is coupled to the capacitor 475 via an inverter 478. An output of the AND gate 479 is connected to an output terminal OUT for generating an output pulse signal. A pulse width of the output pulse signal is determined by a current of the current source 473 and a capacitance of the capacitor 475.

Figure 9:
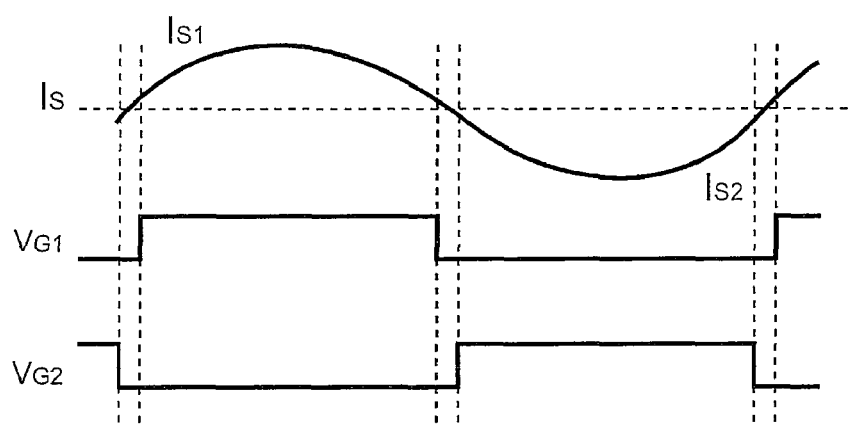
FIG. 9 shows key waveforms of the integrated synchronous rectifiers according to the present invention.

FIG. 9 shows key waveforms of the integrated synchronous rectifiers 51 and 52. $V_{M1,(IS1)}$ represents the switching-current signal of the integrated synchronous rectifier 51. $V_{M2,(IS2)}$ represents the switching-current signal of the integrated synchronous rectifier 52. The switching-current signals $V_{M1,(IS1)}$ and $V_{M2,(IS2)}$ are respectively generated in response to the switching current $I_{S1}$ and the switching current $I_{S2}$ of the transformer 10. Take integrated synchronous rectifier 51 for instance, once the switching-current signal $V_{M1,(IS1)}$ is lower than the threshold $V_{T1}$, the driving signal $V_{G1}$ of the integrated synchronous rectifier 51 will be disabled.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A synchronous rectifying circuit for a resonant switching power converter, comprising:
   a power transistor and a diode, coupled to a transformer and an output of said resonant switching power converter for rectifying;
   a sense transistor, coupled to said power transistor for generating a mirror current correlated to a current of said power transistor;
   a controller, generating a driving signal to control said power transistor in response to a switching-current signal; and
   a current-sense device, coupled to said sense transistor for generating said switching-current signal in response to a switching current of said transformer, wherein said current-sense device is coupled to said sense transistor for generating said switching-current signal in accordance with said mirror current, said controller enables said driving signal to turn on said power transistor once said diode is forwardly biased, and said controller generates a reset signal to disable said driving signal and turn off said power transistor when said switching-current signal is lower than a threshold.

2. The synchronous rectifying circuit as claimed in claim 1, said controller further comprising:
   an inner-lock circuit, generating an inner-lock signal as said driving signal being enabled, wherein said driving signal is initiated and enabled once said inner-lock signal is disabled.

3. The synchronous rectifying circuit as claimed in claim 1, said controller further comprising:
   a maximum-on-time circuit, generating a maximum-on-time signal, wherein said maximum-on-time signal is used to turn off said power transistor for determining a value of a maximum on-time of said power transistor.

4. The synchronous rectifying circuit as claimed in claim 1, said controller further comprising:
   a latch circuit, generating said driving signal to control said power transistor; and
   a plurality of comparators, setting or resetting said latch circuit, wherein said driving signal is enabled once said diode is forwardly biased, and said driving signal is disabled once said switching-current signal is lower than said threshold.

5. The synchronous rectifying circuit as claimed in claim 1, said controller further comprising:
   a phase-lock circuit, generating a phase-lock signal in response to said driving signal and said reset signal, wherein said phase-lock signal is used to turn off said power transistor when said switching-current signal is lower than said threshold.

6. A synchronous rectifying circuit of a power converter, comprising:
   a power transistor and a diode, coupled to a transformer and an output of said power converter for rectifying;
   a controller, having a phase-lock circuit for generating a driving signal to control said power transistor in response to a switching-current signal; and
   a current-sense device, coupled to said power transistor for generating said switching-current signal in response to a switching current of said transformer, wherein said controller enables said driving signal to turn on said power transistor once said diode is forwardly biased, and said phase-lock circuit turns off said power transistor when said switching-current signal is lower than a threshold.

7. The synchronous rectifying circuit as claimed in claim 6, further comprising:
a sense transistor, mirroring said power transistor for generating a mirror current correlated to a current of said power transistor, wherein said current-sense device is coupled to said sense transistor for generating said switching-current signal in accordance with said mirror current.

8. The synchronous rectifying circuit as claimed in claim 6, said controller comprising:
an inner-lock circuit, generating an inner-lock signal as said driving signal being enabled, wherein said driving signal is initiated and enabled once said inner-lock signal is disabled.

9. The synchronous rectifying circuit as claimed in claim 6, said controller further comprising:
a maximum-on-time circuit, generating a maximum-on-time signal, wherein said maximum-on-time signal is used to turn off said power transistor for determining a maximum on-time of said power transistor.

10. The synchronous rectifying circuit as claimed in claim 6, said controller further comprising:
a latch circuit, generating said driving signal to control said power transistor;
a plurality of comparators, setting or resetting said latch circuit, wherein said driving signal is enabled once said diode is forwardly biased, and said driving signal is disabled once said switching-current signal is lower than said threshold.

11. A method of synchronously rectifying for a power converter, comprising:
generating a switching-current signal in response to a switching current of a transformer;
setting or resetting a latch in response to said switching-current signal; and
turning on/off a power transistor in accordance with a status of said latch, wherein said power transistor is coupled to said transformer and an output of said power converter for rectifying, said switching-current signal is generated in response to a mirror current of said power transistor, and said mirror current is correlated to said switching current of said transformer.

12. The method as claimed in claim 11, further comprising:
generating an inner-lock signal as said driving signal being enabled, wherein said driving signal is initiated and enabled once said inner-lock signal is disabled.

13. The method as claimed in claim 11, further comprising:
generating a maximum-on-time signal once said power transistor being turned on, wherein said maximum-on-time signal is used to turn off said power transistor for determining a maximum on-time of said power transistor.

14. The method as claimed in claim 1, further comprising:
generating a reset signal to disable said power transistor once a level of said switching-current signal being lower than a threshold.

* * * * *